United States Patent [19]
Modafferi

[11] 3,823,268
[45] July 9, 1974

[54] DYNAMIC STEREO SEPARATION CONTROL

[75] Inventor: Richard Modafferi, Vestal, N.Y.

[73] Assignee: McIntosh Laboratory, Inc., Binghamton, N.Y.

[22] Filed: June 7, 1972

[21] Appl. No.: 260,483

[52] U.S. Cl. .......................................... 179/15 BT
[51] Int. Cl. .......................................... H04h 5/00
[58] Field of Search ........ 179/15 BT; 325/348, 409, 325/402, 413, 427

[56] References Cited

UNITED STATES PATENTS

| | | | |
|---|---|---|---|
| 3,539,729 | 11/1970 | Von Recklinghausen | 179/15 BT |
| 3,569,633 | 3/1971 | Brahman | 179/15 BT |
| 3,573,382 | 4/1971 | Feit | 179/15 BT |
| 3,673,342 | 6/1972 | Muller | 179/15 BT |

*Primary Examiner*—Kathleen H. Claffy
*Assistant Examiner*—Thomas D'Amico
*Attorney, Agent, or Firm*—Hyman Hurvitz

[57] ABSTRACT

A system for reducing noise in a stereophonic f.m. radio receiving system by dynamically controlling stereo separation in which the two audio channels of an f.m. stereophonic radio receiver are dynamically blended toward and away from the monaural mode progressively and smoothly to an extent determined by amplitude of noise and of modulation signal measured in the receiver.

14 Claims, 14 Drawing Figures

DYNAMIC STEREO SEPARATION CONTROL

BACKGROUND

It is known to provide systems for reducing noise when receiving weak f.m. stereo signals and many such systems relate to reduction of pulse type noise signals, but no such systems are known to me which reduce noise by reducing channel separation as a function of relative modulation signal and noise levels. A monaural audio signal extends from about 50. Hz to about 15 KHz. A stereo signal, on the other hand, contains modulation, in now conventional broadcast systems, on a subcarrier at 38 KHz and extends in two sidebands of that carrier from about 23 KHz to about 53 KHz, in addition to the modulation from 50 Hz to 15 KHz so that stereo bandwidth is almost four times monaural bandwidth, i.e., 53 KHz vs 15 KHz. Demodulation in the stereo decoder converts the sidebands to a single 15 KHz wide channel, so that noise bandwidth can be reduced by a factor of 4 : 1 if the stereo system is operating in the monaural mode.

It follows that noise as observable at the loudspeakers of a stereo receiver is proportional to stereo separation. With no separation, i.e., when the receiver is operated in the mono mode, noise is minimum. If there is no modulation or weak modulation, signal to noise ratio is lowest in the mono mode. As modulation increases, noise increases concomitantly with increasing stereo separation but the audio signal then masks the noise and signal to noise ratio remains stisfactory. It is the function of the present system to control stereo separation on a dynamic basis so that the signal to noise ratio (S/N) is optimized under all signal conditions encountered.

The present system modifies stereo separation as a function of amplitude of audio modulation, but distinguishes between the latter and noise, so that stereo separation will not be increased in response to noise and absent modulation. This is accomplished by deriving one d.c. voltage as a function of supersonic noise received and another d.c. voltage as a function of audio modulation level which may be the L+R signal, L—R signal, or some combination of these, and subtracting these signals to derive a net control voltage which controls conductivity of a blending gate for the left and right stereo channels. Additionally, blending may be controlled in response to receiver AGC voltage, full stereo separation being employed when high r.f. signal level is available, regardless of noise level or modulation amplitude.

Supersonic noise level is detected and audio modulation level is detected in a stereo f.m. receiver, and the difference between the two levels is applied to a device which dynamically controls stereo separation of the left and right stereo channels of a stereophonic radio receiver so as to optimize signal to noise ratio of acoustic output of the receiver.

DRAWINGS

FIGS. 1*a* to 1*c* are plots of signal and noise spectrum, as received in an f.m. stereo radio receiver;

Figure 2:
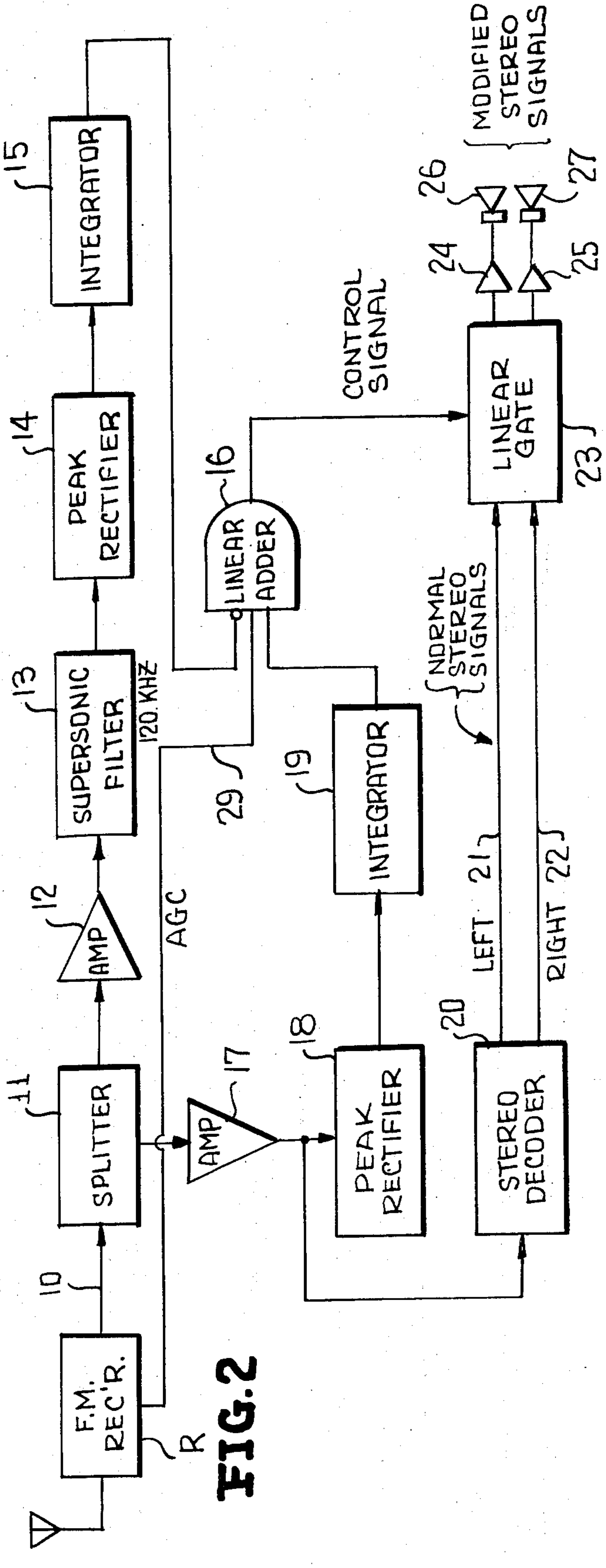
FIG. 2 is a block diagram of a complete system according to the present invention.
Figure 3:
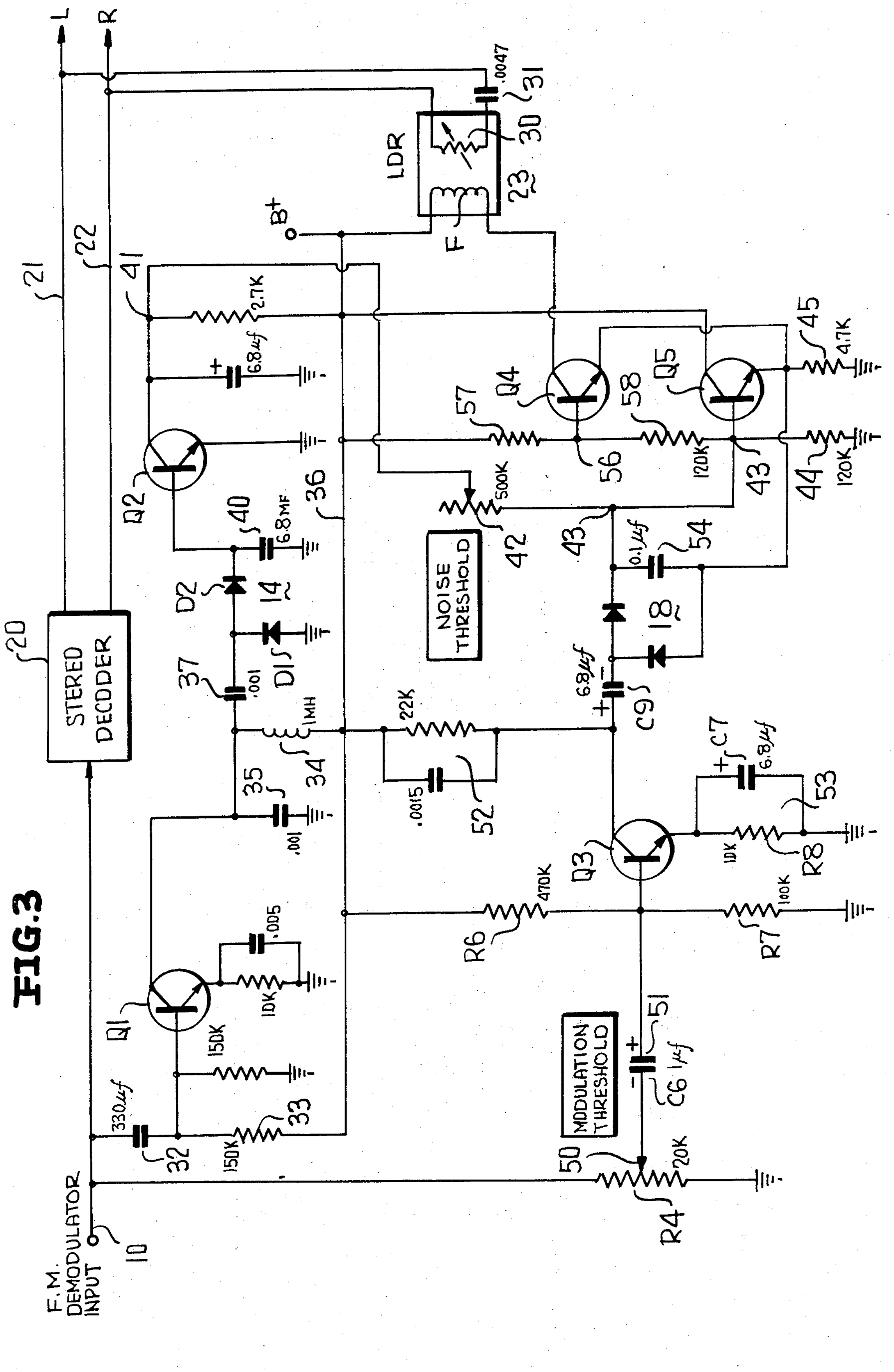
FIG. 3 is a circuit diagram of a modification of the novel elements of the system of FIG. 2.
Figure 4:
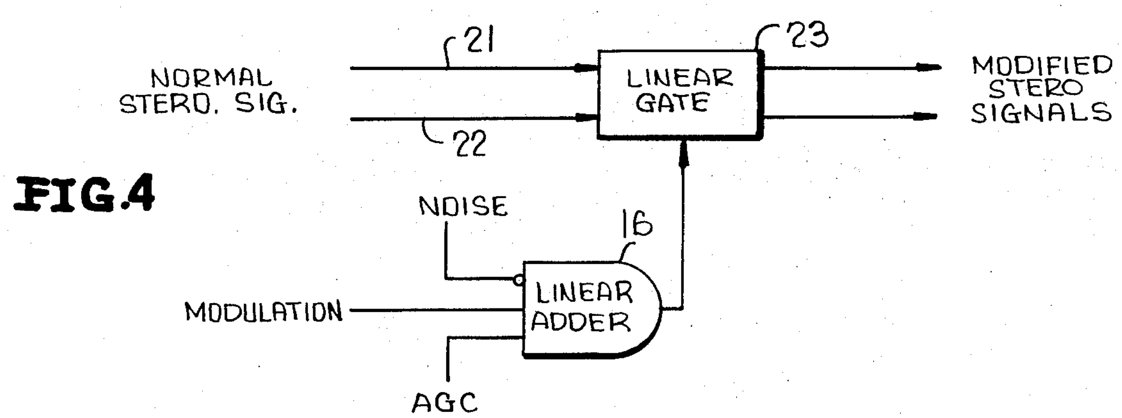
FIG. 4 is a block diagram of a three input dynamic stereo filter gate, employed in the inventions of FIGS. 1 and 2.
Figure 6A:
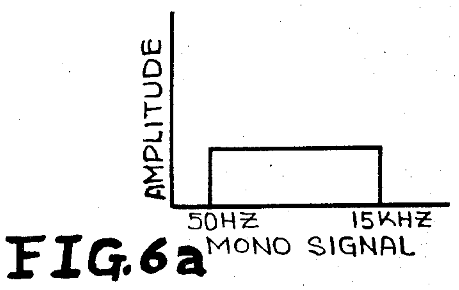
Figure 6B:
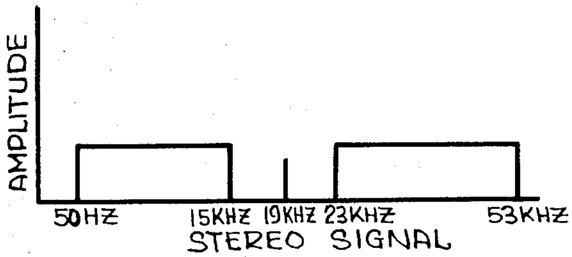
Figure 7A:
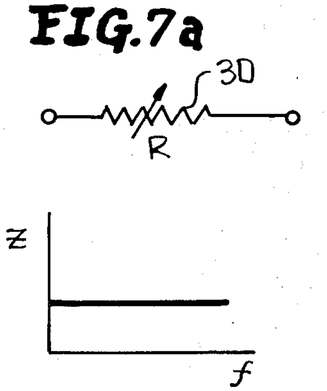
Figure 7B:
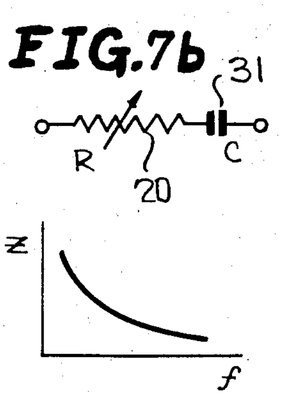
Figure 7C:
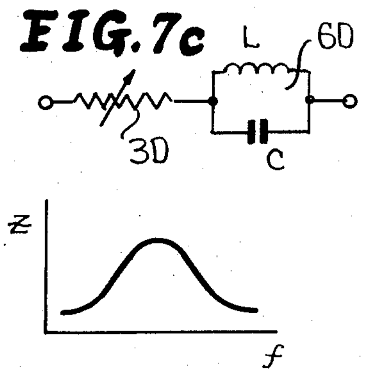
Figure 8:
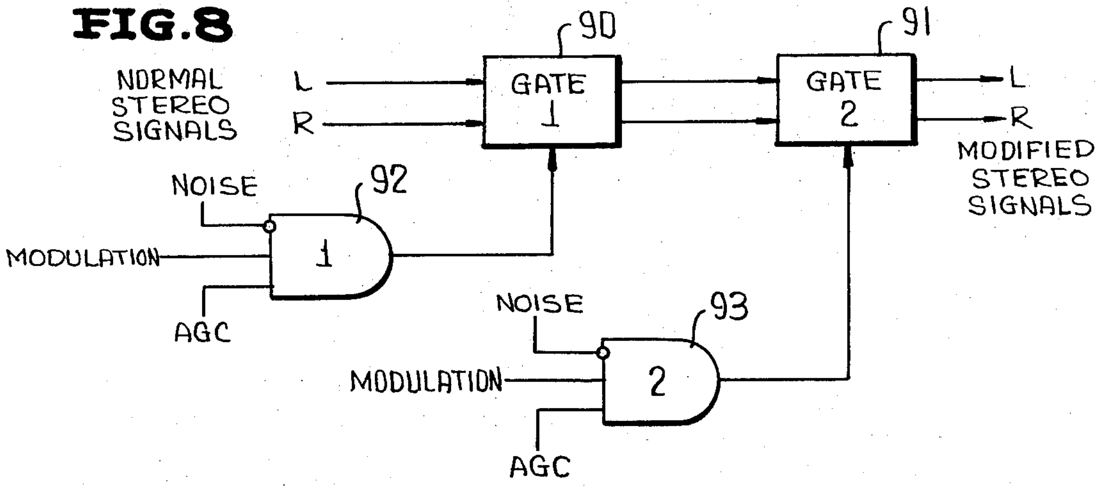
Figure 9:
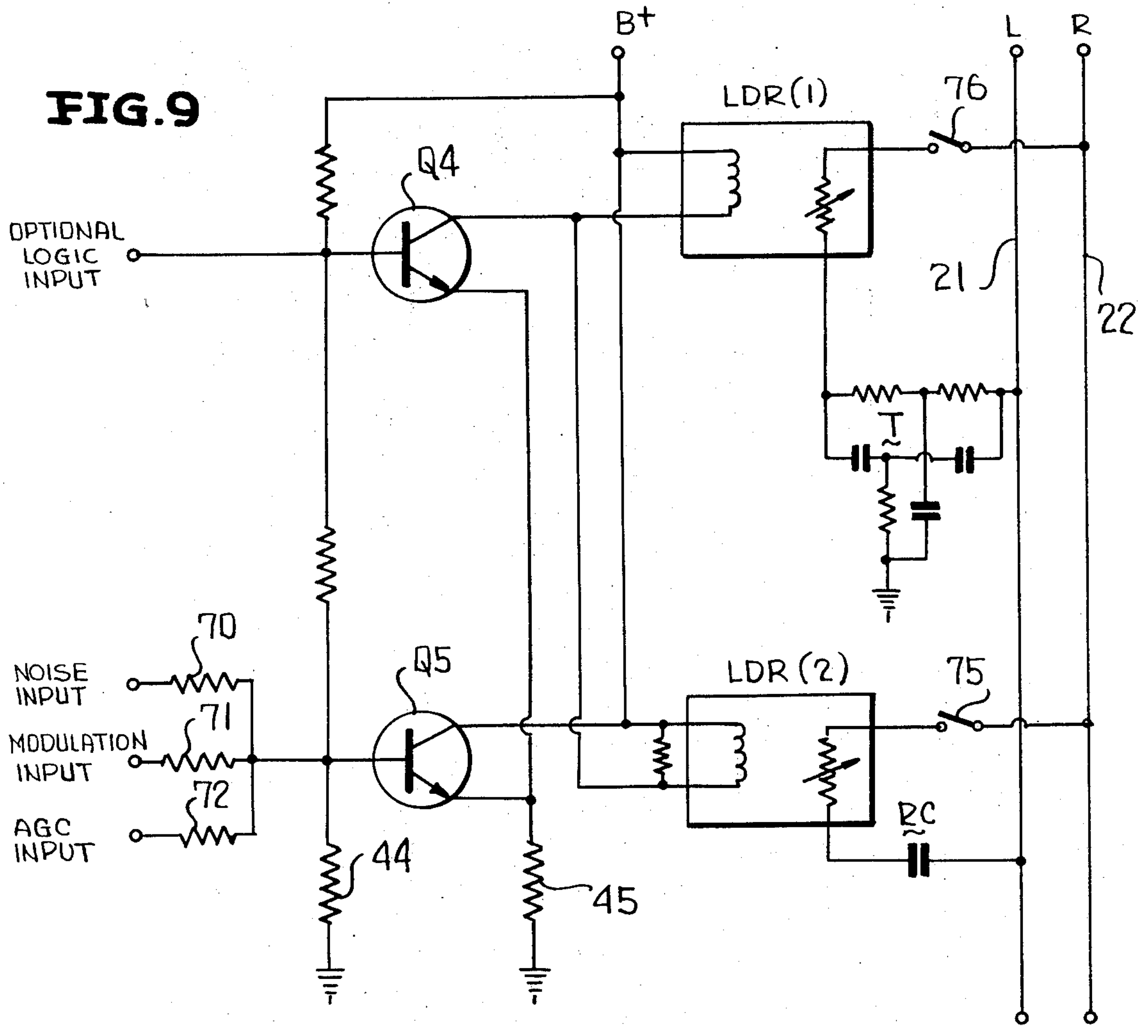

FIGS. 6*a* and 6*b* illustrate the spectra of conventional baseband mono and stereo signals for ready comparison;

FIGS. 7*a* to 7*c* outline in circuit diagram form three alternative types of channel shorting gates suitable for use in the system of the invention;

FIG. 8 is a block diagram of a tandem gate dynamic stereo filter, suitable for use in the systems of FIGS. 2 and 3; and FIG. 9 is a circuit diagram of a filter according to FIG. 8, employing a twin-T filter gate and a high pass capacitor filter gate.

DETAILED DESCRIPTION

Figures 1A, 1B, 1C:
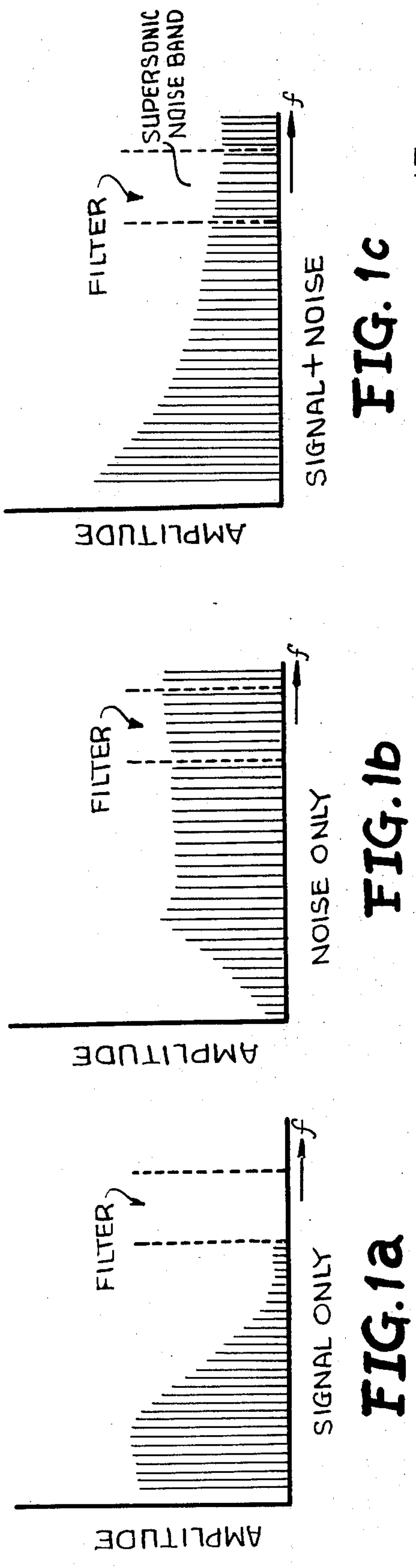

In FIG. 2, 10 is a lead which contains a stereo signal as provided by the f.m. demodulator of a conventional commercial f.m. stereo receiver R. This signal is split into two parts in splitter 11, to provide two similar versions of the signal for processing. One version is amplified, in amplifier 12, and the part of the signal having audio components is rejected by supersonic filter 13, which possesses a definite width of supersonic signal, constituted entirely of noise. See FIG. 1, where plots of typical signal only (plot 1*a*), noise only (plot 1*b*) and signal plus noise (plot 1*c*) are provided. The supersonic noise is about at the same level as is the noise in the audio band, and therefore sampling the former is equivalent to sampling the latter. The noise output of filter 13 is peak rectified in detector 14 and integrated in integrator 15. The output of the integrator 15 is provided to a linear subtractive gate 16, called a linear adder.

The other output of splitter 11 is amplified in amplifier 17, and a portion of the audio modulation output is peak rectified in rectifier 18, integrated in integrator 19 and supplied to linear adder 16. The output of linear adder 16 is a function of modulation minus noise, if there is modulation, but of only noise if there is no modulation.

The output of amplifier 17 is applied to a conventional stereo decoder 20, which derives Right (R) and Left (L) signals on separate leads 21 and 22, for application via linear blending gate 23 to L and R power amplifiers 24, 25 and loud speakers 26 and 27. The function of linear gate 23 is to blend the L and R signals in varying degrees, from monaural to full stereo, according to the control signal provided by linear adder 16. The linear gate 23 is a device for intercoupling the lines 21, 22 with coupling varying theoretically from 0 to 100 percent and is described in detail hereinafter. The inputs to linear gate 16 deriving from integrators 15 and 19 are of the same polarities, but vary in opposite sense, as noise and modulation, respectively, change amplitudes in the same sense, and therefore derives a differential signal at its output.

In the standard compatible stereophonic f.m. system, as received by R in FIG. 2, the main carrier of the f.m. station is modulated by an L and R audio signal at the broadcast station. The same station also transmits a low-level 19 KHz pilot carrier and a 38 KHz suppressed carrier multiplex channel which is amplitude modulated by an L – R signal. In the receiver, the 19 KHz pilot carrier is doubled in frequency and is combined with the modulation sidebands of the multiplex carrier before detection. The L and R and L – R signals are combined through a matrix to obtain L and R signals which feed two stereophonic audio amplifiers and loudspeakers.

The input to splitter 11 contains the entire detected signal, i.e., an audio L and R signal and a sub-carrier modulated by L – R and a pilot signal. The supersonic filter 13 centers on about 120 KHz, so that it is well outside the modulation band. The peak rectifier 18 is band limited from about 20 Hz to about 5 KHz, and therefore responds only when L+R audio modulation is detected. The stereo decoder receives the entire detected signal and therefrom provides L and R signals on leads 21, 22.

If now there were little or no modulation detected by peak rectifier 18, peak rectified noise alone would control linear adder 16, and the gate 23 would be fully on, totally blending the L and R signals, so that each of loudspeakers 26 and 27 would transduce the same signal. Noise reduction can then be about 20 db. If there is a strong modulation, the peak rectified noise signal is overcome and the gate is totally off, providing full stereo reproduction. Signal-to-noise ratio is then excellent in the full stereo mode.

For intermediate conditions the gate 23 is partially on, reducing the apparent stereo separation of the L and R signals but only sufficiently to reduce noise enough to provide a signal-to-noise ratio representing a quality acoustic signal.

Normally an f.m. receiver, as R of FIG. 2, includes an AGC circuit. AGC voltage can be derived on lead 29 for application to linear adder 16 in such sense as to suppress output and thus leave the linear gate fully on. This can be set to occur when signal strength is above 300 $\mu$v, for example, since in such case the stereo signal-to-noise ratio will exceed 60 db, making operation of linear gate 16 unnecessary.

Figure 5:
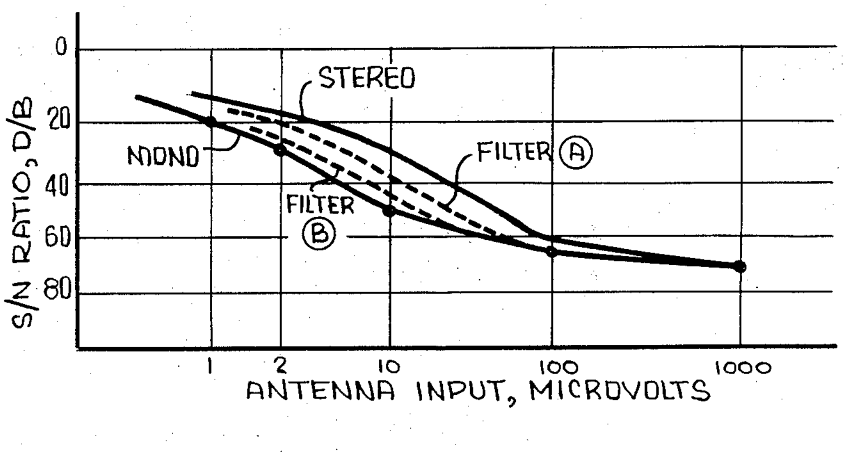
FIG. 5 is a plot of signal to noise ratio versus antenna output in microvolts, for various mono - stereo relations in the operation of the present system.

FIG. 5 illustrates the characteristics of the present system in terms of antenna input in microvolts, plotted against S/N ratio in DB. It is feasible to attain any curve of stereo separation from full mono, as illustrated in the lowermost curve to full stereo, as illustrated in the uppermost curve, including two intermediate curves, labelled filter A and filter B, by suitably adjusting the parameters of the system. The theoretical maximum improvement is approximately 23 db. Generally, increasing noise will tend to turn the linear gate on, while increasing modulation and/or AGC voltage will tend to turn the gate off.

In FIG. 3, which is a schematic circuit diagram corresponding very generally to the block diagram of FIG. 2, 10 is an f.m. demodulator input signal lead which proceeds to stereo decoder 20, from which stereo signals proceed to L and R lines 21 – 22. The latter are connected together via a light sensitive resistance 30 in series with a capacitor 31. If the resistance 30 is unilluminated it presents essentially an infinite resistance and the lines 21, 22 are not intercoupled. For full illumination, resistance 30 may be assumed of negligible value, but capacitor 31 remains in circuit and presents impedance for low frequencies, the overall characteristic being illustrated in FIG. 7*b*, i.e., shorting is nearly complete at high frequencies but some stereo separation remains for low frequencies, which retains a stereo effect even when linear gate 23 is in the full mono mode.

Transistor Q1 is coupled to lead 10 via a high pass filter comprising capacitor 32 and effective resistance at the base of Q1 series. The collector load of Q1 is a tuned circuit, resonant at about 120 KHz, and including inductance 34 and capacitor 35, connected in series between B+ lead 36 and ground, the junction 37 being connected to the collector of Q1. This junction is capacitively coupled via capacitor 37 to a conventional peak rectifier 14, comprised of a shunt diode D1 having its anode grounded and of a series diode D2 having its anode coupled to capacitor 37 and its cathode connected to a storage capacitor 40 and to the base of Q2. Capacitor 40 derives a d.c. voltage representative of peak noise, which is amplified and phase reversed by Q2, and appears at point 41, the Q2 amplifier being conventional. The voltage available at point 41 is transferred through a variable resistance 42, to point 43 and from point 43 to ground via resistance 44.

The base of Q5 is connected to point 43, Q5 having its emitter connected to ground via an un-bypassed resistance 45 and its collector connected directly to B+ line 36. Q2 is a phase reverser, whereby as noise increases positively the voltage at the base of Q4 decreases. Q2 is designed to saturate on strong noise and to cut-off in the absence of input voltage.

Q3 is intended to pass only low frequency audio, in the band about 20 Hz to 5 KHz. Its input derives from a tap 50 on a resistance 50*a* extending from lead 10 to ground and it is AC coupled to top 50 via a large capacitor 51. Q3 includes a parallel RC collector load 52 and a parallel RC emitter bias circuit 53. The output of Q3 is a narrow band audio signal and is A-C coupled to peak rectifier 18, the output of which is a d-c control signal appearing across integrating capacitor 54, and applied between base and emitter of Q5.

There exists no phase reverser following peak rectifier 18, as is the case following peak rectifier 14. Accordingly, the two peak rectifier 14 and 18 tend to drive Q5 in opposite senses. The emitter of Q5 is directly connected to the emitter of Q4, the base of Q4 being connected to a point 56 of fixed bias on a voltage divider composed of resistances 57, 58, 44. Accordingly, as the voltage on resistance 45 varies so does the voltage at the base of Q4, controlling its conductivity.

The integrated audio signal tends to turn Q5 on, while the integrated noise tends to turn Q5 off. When Q5 turns on Q4 turns off, and vice versa. Q4 energizes a filament F of LDR 23, which constitutes a linear resistive gate 23 having an extremely wide range of resistances.

When Q5 turns on Q4 turns off and LDR 23 turns off increasing stereo separation. In the presence of high level noise Q4 turns on, LDR 23 turns on, and stereo separation decreases.

Taking noise as proportional to stereo separation, with no separation noise is at a minimum, and this occurs for no audio signal. With full audio signal, stereo separation is maximum and so is noise, but the noise is then masked, i.e., S/N is high.

In FIG. 7 is illustrated three typical linear shorting gate filters, which can be substituted. The gate illustrated in FIG. 7*a* is a pure resistance. This is least desirable, but is operative. The circuit of FIG. 7*b*, utilized in FIG. 3, provides nearly complete blending at high frequencies, where noise is most disturbing, but retains some stereo separation at low frequencies, regardless of S/N of the received r.f. signal. Psychologically this retains stereo effect, while reducing noise.

The circuit of FIG. 7*c* involves an LC tank 60 in series with resistance 30. If the tank is mid-audio band, both low and high frequencies are blended and noise is reduced for these frequencies, but signals centrally of the audio band are heard stereophonically.

Stereo effect is then due to the pass band of the filter, which can be about 200 – 500 Hz and noise also is restricted to this part of the entire audio band. Combinations of the circuit of FIGS. 7*b* and 7*c* can be employed, of plural linear gates can be parallel, or otherwise associated, having however each a different pass characteristic, the general purpose being to preserve to some extent a subjective stereo effect while reducing total noise over the entire audio band by as much as 20 DB.

In FIG. 9 is illustrated a gate system. Q5 is controlled by noise and modulation, but also by an AGC voltage, as in FIG. 2, resistances 70, 71, 72 in conjunction with resistance 44 acting as an adder, the sum appearing across resistance 45 and controlling the conductivity of Q4, as in FIG. 3. Q4 is here also used as a control, in that negative control voltages at the base of Q4 act like positive voltages at the base of Q5. $LDR_2$ has a resistance R in shunt to its filament, but $LDR_1$ does not, but both LDR's are connected in parallel between B+ and Q4. A voltage applied to $LDR_1$ will therefore not affect $LDR_2$. As LDR control current increases sufficiently, $LDR_2$ will be turned on, but this will only occur after $LDR_1$ is nearly fully on. The effect is that of introducing a time delay between operation of $LDR_1$ and $LDR_2$.

$LDR_1$ gates a narrow band twin T-filter across lines 21 and 22, and only after this occurs does the series RC filter RC associated with $LDR_2$ operate to couple all except high frequencies between lines 21 and 22. It is feasible also, by means of switches 75, 76 to switch out either gate at will.

A further example of a suitable dynamic stereo gate system is illustrated in block form in FIG. 8, wherein two linear gates 90, 91 are connected in tandem, and are separately controlled by separate adders 92, 93. The adders 92, 93 may have diverse response characteristics, i.e., may add voltages which are in any manner desired related to noise modulation and AGC, and particularly to all or only to some of these. The gates 90 and 91 may likewise have diverse frequency spectra. It can then be arranged that the adders and/or the gates become operative in sequence, or with respectively slow and fast time constants, or for a variety of S/N or r.f. carrier levels. Cascaded gates, as in FIG. 8, may be distinguished from parallel gates, as in FIG. 9, and it is intended to indicate that a wide variety of effects may be achieved, within the broad scope of the invention, by employing various filters and combination of gates, adders and added control signals.

I claim:

1. In a stereophonic radio receiver, means for receiving a carrier signal frequency modulated by a left plus right sum aduio signal and by a sub-carrier amplitude modulated by a left minus right audio signal, means responsive to said modulated carrier for deriving on separate leads all the left audio signal and all the right audio signal present on said carrier, respectively, impedance means including variable resistance connecting one of said leads to the other, means for peak rectifying at least one of said audio signals to provide a control signal, means for integrating said control means to provide a further control signal, dynamic signal responsive to said further control signal for controlling the value of said resistance such that said resistance variably and gradually increases with an increase in the amplitude of said further control signal, and left and right loud speakers respectively connected to said separate leads.

2. The combination according to claim 1, wherein said resistance is light sensitive resistance, variable light source means illuminating said light sensitive resistance, and means responsive to said further control signal for controlling the intensity of light provided by said light source means.

3. The combination according to claim 2, including means responsive to the amplitude of said carrier for further varying the intensity of light provided by said light source such that said resistance increases with amplitude of said carrier.

4. In a stereophonic radio receiver, means for detecting a frequency modulated carrier to provide a detected wave including an audio signal component and a supersonic noise component, means for separating said audio signal component from said supersonic noise component to provide a noise representative signal, means for rectifying said supersonic noise component, means for peak rectifying and integrating said audio signal component to provide an integrated audio signal representative signal, means for comparing said noise representative signal with said audio signal representative signal to provide a control signal, means for decoding said audio signal component to provide in separate channels left and right stereophonic audio signals, and means for dynamically blending said left and right audio signals in response to said control signal, said last means being a linear gate means, and separate loud speakers connected to said separate channels.

5. The combination according to claim 4, wherein said linear gate means includes light producing means responsive to said control signal and a circuit including a light responsive resistance connected between said channels.

6. The combination according to claim 5, wherein said linear gate means is a single linear gate.

7. The combination according to claim 5, wherein said linear gate means is a plurality of linear gates connected in parallel and having diverse controlling signals, said control signal including plural ones of said controlling signals each connected to a respective linear gate.

8. The combination according to claim 5, wherein said linear gate means is a plurality of linear gates connected in cascade and having diverse controlling signals, said control signal including plural controlling signals each connected to a respective linear gate.

9. The combination according to claim 5, wherein said circuit including a light responsive resistance is a circuit having roll off within the audio band.

10. The combination according to claim 5, wherein said means for comparing is a linear adder responsive subtractively to said audio signal representative signal and said noise representative signal and wherein said means for dynamically blending said audio signals is responsive to said noise representative signal to increase said blending.

11. The combination according to claim 10, wherein is included means responsive to the level of said carrier for providing input to said linear adder for minimizing said blending for carrier levels above predetermined values.

12. The combination according to claim 5, wherein said linear gate means is plural linear gates having different audio response spectra.

13. In a stereophonic radio receiver, means for receiving a modulated carrier frequency modulated by a left plus right audio signal and by a sub-carrier amplitude modulated by a left minus right audio signal accompanied by ultrasonic noise, decoder means responsive to said modulated carrier for deriving in separate channels a left audio signal and a right audio signal respectively, and means for blending the contents of said separate channels in response to a comparison made antecedent to said decoder means of the levels of said ultrasonic noise and of the average peak audio modulation of said modulated carrier, said last means being responsive to an increasing of said ultrasonic noise level for increasing said blending and to said average peak audio modulation level for decreasing said blending, and separate loud speakers respectively connected to said separate channels.

14. In combination, means for receiving a stereophonic carrier signal, said means including means for developing an automatic gain control signal inversely proportional in amplitude to the amplitude of the received carrier, means for dividing said carrier signal into two paths, means in one of said paths for developing a first integrated control voltage representing average ultra high frequency noise received by said means for receiving concurrently with said carrier signal, means in the other of said path for developing a second integrated control voltage representative of audio peak signal modulation of said carrier signal, means for decoding said stereophonic carrier signal to provide left and right stereophonic audio signals in separate audio channels, a blending gate interconnecting said separate audio channels, an adder for adding said automatic gain control signals to said control voltages, and means responsive to the output of said adder for controlling said blending gate to optimize signal-to-noise ratio at the outputs of said audio channels by controlling stereo separation of the audio signals in said channels.

* * * * *